(12) United States Patent
Soitu et al.

(10) Patent No.: US 6,919,656 B2
(45) Date of Patent: Jul. 19, 2005

(54) ELECTRIC ASYNCHRONOUS MOTOR

(75) Inventors: Viktor Soitu, Lappeenranta (FI); Jaakko Sailakivi, Tampere (FI); Pekka Laakkonen, Helsinki (FI)

(73) Assignee: Voith Paper Patent GmbH, Heidenheim (DE)

( * ) Notice: Subject to any disclaimer, the term of this patent is extended or adjusted under 35 U.S.C. 154(b) by 562 days.

(21) Appl. No.: 10/116,807

(22) Filed: Apr. 5, 2002

(65) Prior Publication Data
US 2002/0149273 A1 Oct. 17, 2002

(30) Foreign Application Priority Data
Apr. 6, 2001 (DE) .......................................... 101 17 398

(51) Int. Cl.$^7$ ................................................. H02K 1/32
(52) U.S. Cl. ........................... 310/58; 310/64; 310/656; 310/58; 310/52; 310/54; 310/53
(58) Field of Search .............................. 310/58, 52, 59, 310/64, 65, 60 A, 63

(56) References Cited

U.S. PATENT DOCUMENTS 5,744,880 A    4/1998   Kudoh et al. .................. 310/58

FOREIGN PATENT DOCUMENTS

| DE | 10 82 974 A | 6/1960 | |
| DE | 42 32 322 A1 | 3/1994 | ............ H02K/9/19 |
| DE | 43 15 280 A1 | 1/1995 | ............ H02K/9/19 |
| DE | 196 51 119 A1 | 7/1998 | ............ H01K/9/19 |
| DE | 197 42 255 C1 | 11/1998 | ............ H02K/9/16 |
| DE | 299 08 433.7 | 5/1999 | |
| DE | 199 05 538 A1 | 8/2000 | ............ H02K/1/32 |
| DE | 100 35 578 A1 | 1/2002 | ............ F16C/13/00 |
| GB | 2 105 117 A | 3/1983 | ............ H02K/3/24 |
| JP | 2000209813 | 7/2000 | ............ H02K/9/16 |
| WO | WO 97/45941 | 12/1997 | ............ H02K/17/16 |

Primary Examiner—Thomas M. Dougherty
Assistant Examiner—Iraj A. Mohandesi
(74) Attorney, Agent, or Firm—Taylor & Aust. P.C.

(57) ABSTRACT

An electric asynchronous motor for driving a shaft, a roll shell or a similar machine element includes an annular rotor and an annular stator, each having an end face at each of their respective ends. The rotor is connected to a motor shaft by way of spokes. A motor cooling system includes an internal cooling air circuit wherein an air stream flows between the rotor and the motor shaft as well as through an annular heat exchanger for transferring heat from the rotor and/or the stator to a cooling liquid. The annular heat exchanger is positioned within the motor's housing in the area of an end face of the rotor. The cooling air stream also passes over blower vanes and at least one annular series of air circulation channels in the annular body of the stator and/or of the rotor with air streams flowing from the one end face to the other end face of the stator and/or of the rotor, so that the cooling air circuit forms an internal toroidal air stream.

36 Claims, 9 Drawing Sheets

Fig. 4
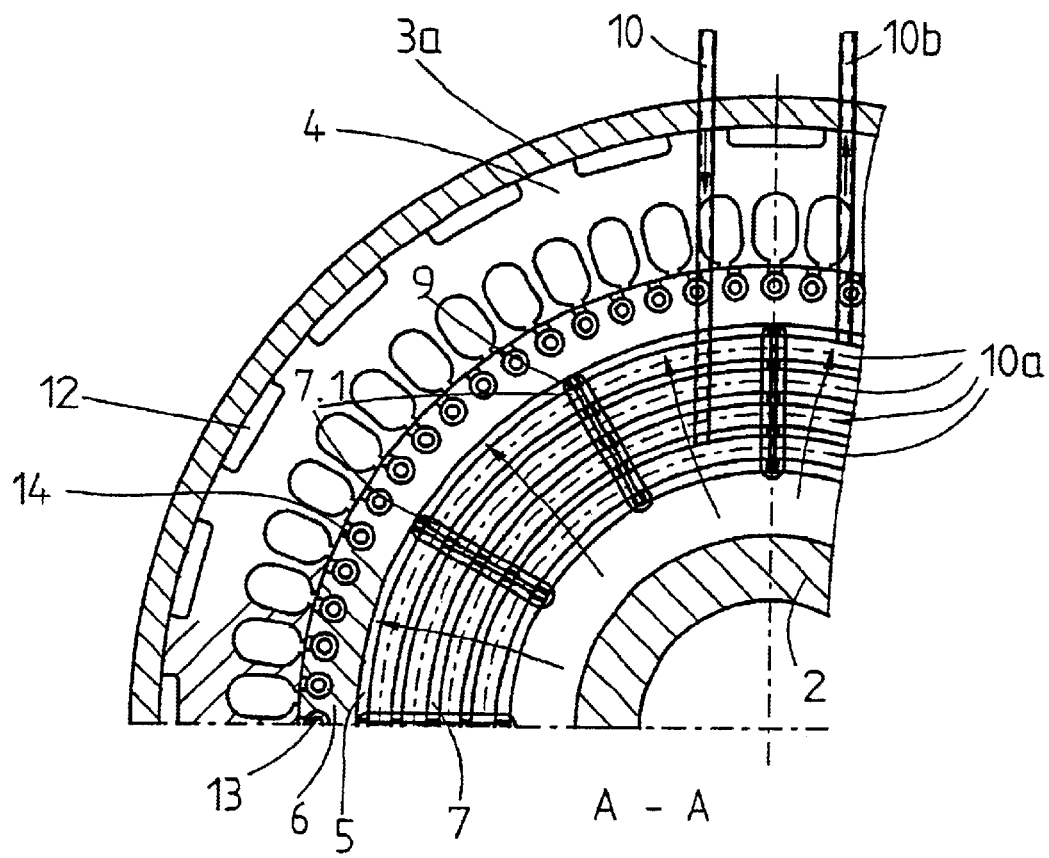
Fig. 6
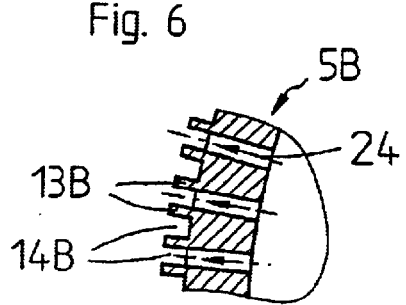
Fig. 5

Section C-D

ELECTRIC ASYNCHRONOUS MOTOR

BACKGROUND OF THE INVENTION

1. Field of the Invention

The present invention relates to an electric motor, and more particularly to an electric asynchronous motor and method of using an electric asynchronous motor.

2. Description of the Related Art

DE 299 08 433.7 discloses an electric motor for a drive of a roll or cylinder of a paper making or a paper finishing machine. This device may be used as a direct drive or as an indirect drive. "Direct drive" means to directly connect the motor's rotor to a journal of a roll or cylinder, without the use of any intermediate power transmission, e.g. a speed reducing gear transmission. The electric motor is designed as a so-called "slip-on motor" and arranged between the body and the bearing of the roll or cylinder. Openings are provided in the motor's housing for the supply of cooling air to the motor's inner elements. An additional blower may be activated, when the driving speed is low.

DE 100 35 578.1 discloses an electric motor designed for directly driving a roll or a cylinder of a paper machine. The cooling system of this motor uses lubricating oil, which is primarily for the lubrication of the bearings of the roll or the cylinder. The cooling system includes a cooling line extending helically around the motor's stator, and more precisely between the stator and the housing.

WO 97/45941 discloses a so-called "solid rotor" for an electric machine. The solid rotor has some advantages over the conventional laminated rotor, but there are overheating problems, particularly in cases where small rotational speeds are desired, which are needed for a direct drive. WO 97/45941 seeks to overcome the overheating problem by way of some different types of solid rotors, all having at their end faces short-circuit rings of a material having good electrical conductivity. However, an electric machine using any of the rotors disclosed in WO 97/45941 still needs a cooling system, particularly if it is utilized for a direct drive, e.g. for rolls or cylinders of paper machines. WO 97/45941 does not disclose any manner cooling at all.

DE 199 05 538 A1 discloses an electric motor for the drive of a vehicle. The electric motor includes an annular rotor and an annular stator, both being positioned in a housing. A cooling system is included having a heat exchanger for transferring heat from the rotor and the stator via an internal cooling air circuit to a cooling liquid. The heat exchanger is positioned outside a part of the housing section, which is wrapped around the stator. The internal cooling air circuit includes an air stream, which flows through the heat exchanger and through an area between the rotor and a solid motor shaft. The solid motor shaft connected to the rotor by way of connecting elements, e.g. radial vanes. The capacity of this cooling system may be sufficient, if the motor is utilized to drive a vehicle. However, if the motor were used to drive any element of a paper machine, particularly in a hot environment and as a direct drive, then the capacity of the cooling system would be insufficient.

Also, in the electric motor disclosed in DE 199 05 538 A1, the ratio between the outer diameter of the rotor and the outer diameter of the housing section, which is directly wrapped around the stator, the ratio is about 0.5:1, which is a relatively low value resulting in low torque, particularly at low speed. This is another reason why this known electric motor is useless for the direct drive of a machine component such as a roll or a cylinder of a paper machine.

What is needed in the art is an electric motor that is adequately cooled even at slow speeds.

SUMMARY OF THE INVENTION

The present invention provides an electric asynchronous motor, which fulfills the following demands:

1. The motor is able to directly drive a shaft, a roll shell or similar machine element. However, the motor may also be used for an indirect drive.
2. In particular, the motor is able to drive a roll or a cylinder of a machine for making or finishing paper or cardboard; the drive device shall be formed as a direct drive, with the motor being a "slip-on motor."
3. More precisely, the motor is able to directly drive any roll or cylinder even at low speed, e.g. at the so-called "inching" or "creeping" speed, which is frequently needed during the start-up of a paper machine.
4. The motor has a higher output/higher torque compared to the prior art motors, even in the start-up range.
5. Any overheating problems are eliminated by way of an efficient cooling system.
6. In particular, the cooling system is configured to prevent the leakage of liquid to the motor's inner elements.
7. The cooling system avoids or minimizes heat transmission from the motor's inner elements to any bearings or other sensitive parts of the roll or cylinder to be driven.
8. The motor's rotor is configured to keep its balance as well as possible, i.e. the critical frequency is avoided within a wide range of rotational speeds, which occur, particularly in direct driving a roll or cylinder of a paper machine. Such a machine operates in a range of working speeds between about 20m/min (the "inching" or "creeping" speed) and a speed of 2000 m/min or more.
9. In a direct drive configuration of a paper machine roll, or similar machine component, the motor's outer diameter is not larger than the roll's outer diameter and the overall length of the motor allows the motor to be positioned between the roll body and the bearing of the roll.

The main idea of the present invention is to solve problems of the prior art motors by utilizing a combination of the following features:

A) At least one heat exchanger, for transferring heat from the cooling air stream to a cooling liquid, is formed as a ring and is positioned concentrically to the motor's axis, in the area of one end face of a rotor. The outer diameter of this annular heat exchanger can be made almost as large as the outer diameter of the rotor. Furthermore, the inner diameter of the annular heat exchanger is made as small as possible. These features together result in a high cooling capacity heat exchanger.

B) The annular stator and/or the annular rotor include at least one annular series of air circulation channels that guide air streams from one side to the other side of the stator and/or rotor. As a result of this configuration, the complete interior of the electric motor is "filled" with a toroidal air stream, which is similar to the toroidal liquid stream obtained within a hydrodynamic coupling, retarder or torque converter. In each of various longitudinal sections of the motor, e.g. horizontal and vertical ones as well as in other sections therebetween, the toroidal air stream can be seen in the form of two circular air streams. In contrast thereto, DE 199 05 538 A1 discloses only one circular air stream that being in the area of the heat exchanger, which is positioned outside a part of the housing section wrapped around the stator. Therefore, DE 199 05 538 A1 does not show a toroidal air stream.

An advantage of the present invention is that a toroidal air stream, flowing completely inside of the motor's housing, is able to absorb a very high amount of heat in a very uniform way around the annular body of the stator and/or the rotor. In combination with the high cooling capacity of the at least one annular heat exchanger, the efficiency of the complete cooling system is significantly improved. This allows the motor to be utilized as a direct drive of a machine component, e.g. roll of a paper machine, even during a long start-up period at low speed, e.g. at creeping speed.

Another advantage of the present invention is that the overall length L of the motor housing can be made relatively small; i.e. the ratio L:H between length L and the housing's outer diameter H can be less than 1:2.0, preferably less than 1:2.5. This allows the motor, if designed as a so-called "slip-on motor", to be arranged directly on a roll shaft or on a drive shaft of another machine component, preferably between that component, such as a roll body, and a bearing device.

A further advantage, particularly over prior art document DE 199 05 538 A1 is that the cooling air stream does not flow through the area outside of the housing section wrapped around the stator. Therefore the motor's periphery is substantially cylindrical, with its outer diameter generally being smaller than the outer diameter of a roll.

Another embodiment of the electric motor of the present invention utilizes a relatively large ratio R:H between outer diameter R of the rotor and outer diameter H of the housing. This ratio R:H is between 0.6:1 and 0.85:1; preferably between 0.7:1 and 0.75:1. This measure results first in relatively high output and torque, even at low speeds and secondly in more space for the annular heat exchangers. The heat exchanges may have a large outer diameter in order to increase the cooling capacity.

In the electric motor of the present invention, the rotor includes at least one annular chamber. Preferably, the annular chamber is positioned within the rotor, and is open towards the space proximate to the end face of a rotor. It is also preferred that the rotor includes two annular chambers, each positioned in the area of one of the two end faces of the rotor. The two annular chambers within the rotor are connected, one to the other, by a series of openings arranged around the rotor's axis. The rotor is connected to a motor shaft by way of connection elements, such as spokes, rods or vanes, and an internal cooling air stream flows through the openings between the rotor and the motor shaft. The connecting elements induce the internal cooling air stream. Furthermore, the mass of the rotor is relatively low.

If desired, the at least one annular heat exchanger, arranged in the area of an end face of the rotor, may be positioned within one of the annular chambers. This allows a relatively small overall length of the motor. The present invention is applicable to both, a motor having a solid rotor and a motor having a laminated rotor. The invention may also be utilized in a design wherein the rotor is directly connected to the inner periphery of a roll shell, or of a similar element to be driven, with the rotor being wrapped around the stator, which is mounted on a stationary shaft. In this configuration the stator, which is mounted within a stationary housing, is wrapped around the rotor.

In many cases it is advantageous to amplify the internal toroidal air stream by way of additional blower vanes. The blower vanes may be arranged on the connecting elements. It is, however, preferred to arrange the additional blower vanes at one of the end faces of the rotor.

In summary, with the electric motor according to the present invention, high output and torque values can be obtained in combination with a high cooling capacity. Therefore, this motor is particularly suitable for a direct drive application where a speed range between a very low speed (e.g. inching speed) and ordinary speeds are utilized. An ideal use of this motor is with rolls or cylinders of paper machines. However, it should be understood that this motor might also be utilized in an indirect drive configuration. As an example, the motor may be directly positioned on an input journal of a gearbox.

Further important features, of the present invention, include the feature that the leakage of cooling liquid within the motor housing is avoided. This is achieved by a liquid cooling system, including the annular heat exchanger, which is hermetically separated from the interior of the motor. The liquid cooling lines, including the annular heat exchanger, are manufactured without any joints, which possibly might open. As an example, the liquid cooling system, includes an inlet line, a heat exchanger and an outlet line all formed as a one-piece-structure.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 shows a partial cross section along line A—A of the electric motor shown in FIG. 3;

FIG. 5 shows a partial section along line B—B of the electric motor shown in FIG. 3;

FIG. 6 shows a detail of a modified rotor of the electric motor of the present invention;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
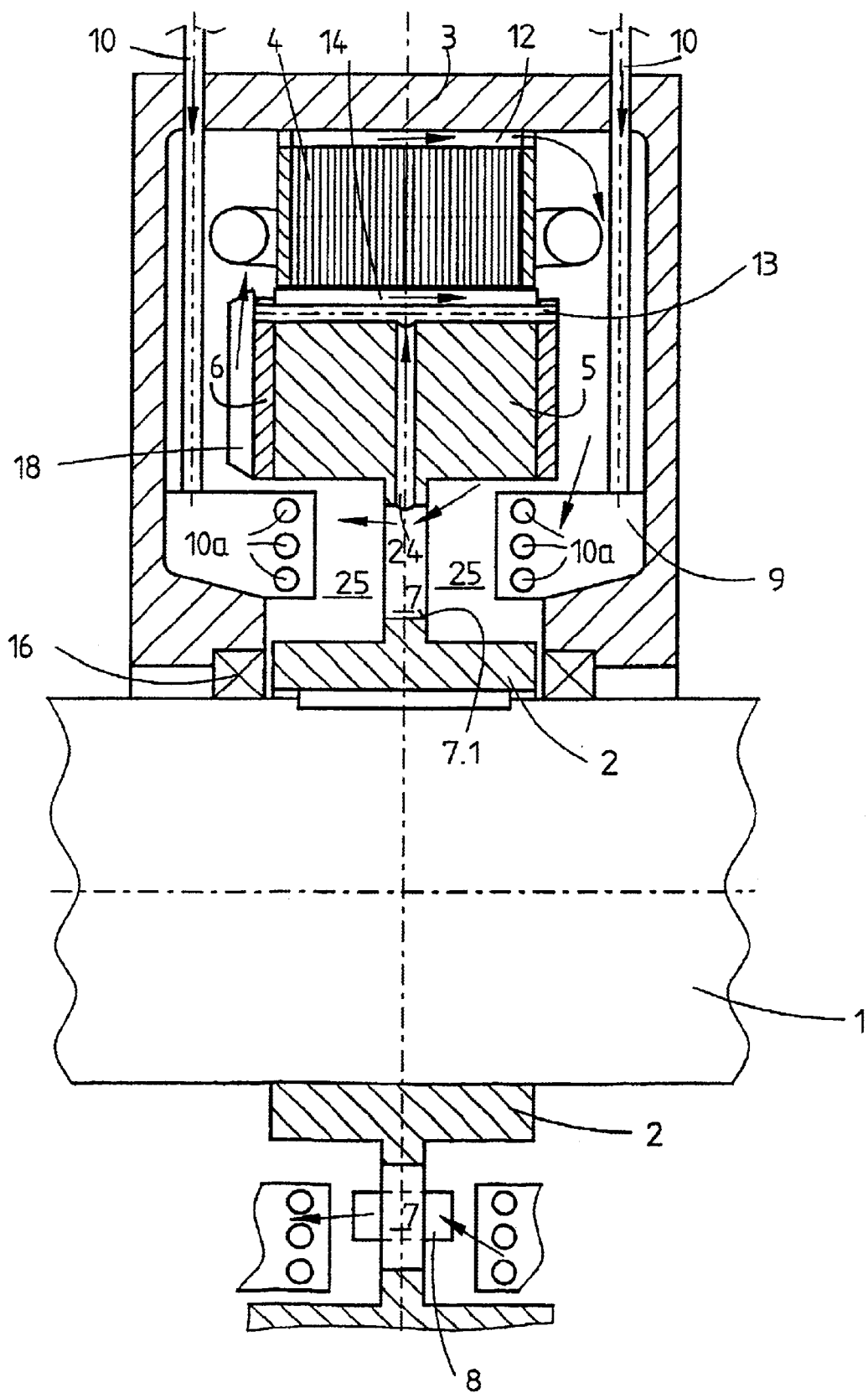
FIG. 1 shows a partial longitudinal section of an embodiment of an electric motor of the present invention.

Referring now to the drawings there is shown several embodiments of the present invention.

The embodiment of the electric asynchronous motor, as shown in FIG. 1, includes a rotor 5 connected by radial arms 7, or similar elements, to a hollow motor shaft 2. Hollow motor shaft 2 is directly connected to shaft 1 and is driven thereby. Also, the motor includes stator 4 which is wrapped around rotor 5 and which is supported by housing 3. Shaft 1 together with rotor 5 is supported by way of antifriction bearings 16 within housing 3. Rotor 5 and stator 4 have an annular form. Radial arms 7 form openings 7.1 therebetween as shown in FIGS. 4 and 5. Rotor 5, as shown in FIG. 1, is a so-called "solid" rotor because it lacks laminated iron plates. At each end face of rotor 5, a short circuit ring 6 is provided. There are also hollow short-circuit bars 13 arranged parallel to an axis of rotor 5 and close to the air gap between rotor 5 and stator 4.

In the area of each of the end faces of rotor 5, an annular chamber 25 is provided between rotor 5 and motor shaft 2. Each annular chamber 25 is bordered by radial arms 7, and is open towards a side of rotor 5. Two annular chambers 25 are connected, one to the other, by openings 7.1.

According to one embodiment of the invention, annular heat exchanger 10a is positioned within each annular chamber 25. Heat exchanger 10a includes a series of circular cooling liquid lines. At each side of rotor 5 there is positioned a heat exchanger in the form of helical cooling liquid line 10a, which together with supply line 10 and discharge line 10b, form a one-piece-structure. Cooling liquid system 10, 10a and 10b is completely free from any joint which might possibly open. Cooling liquid lines 10a are supported by arms 9 mounted within housing 3. In operation, heat is very effectively transmitted from rotor 5 and from stator 4 to heat exchangers 10a because radial arms 7 induce an internal air stream.

According to another embodiment of the invention, the internal air stream is a toroidal one and may be intensified by blower vanes 8, positioned at radial arms 7, and/or by additional blower vanes 18, arranged at one end face of rotor 5, preferably at one of short circuit rings 6. The toroidal air stream passes openings 7.1 towards the left side, as illustrated in FIG. 1, then passes one of heat exchangers 10a, additional blower vanes 18, partly through cooling air channels 14 arranged in the periphery of rotor 5 and substantially parallel to the axis of rotor 5 and partly through cooling air channels 12, provided between housing 3 and stator 4, towards the right side. The toroidal air stream continues flowing radially toward shaft 1, through heat exchanger 10a and returns to openings 7.1. Alternatively, rotor 5 may include radial air feeding channels 24 connecting openings 7.1 to hollow short circuit bars 13.

Figure 2:
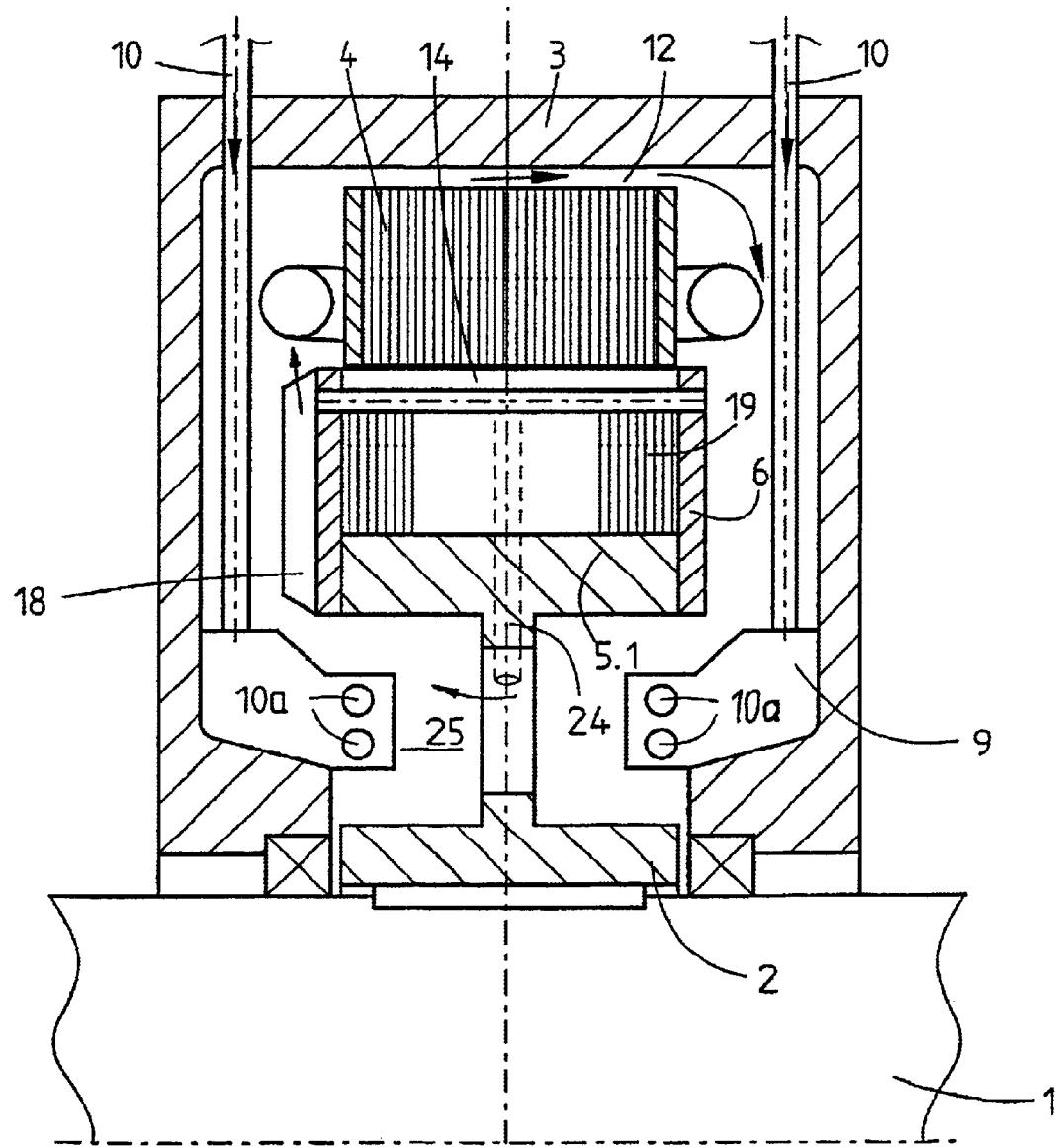
FIG. 2 shows a modification of FIG. 1.

The embodiment of the electric motor illustrated in FIG. 2, differs from the electric motor of FIG. 1 in that rotor 5.1 supports a plurality of laminated iron plates 19.

Figure 3:
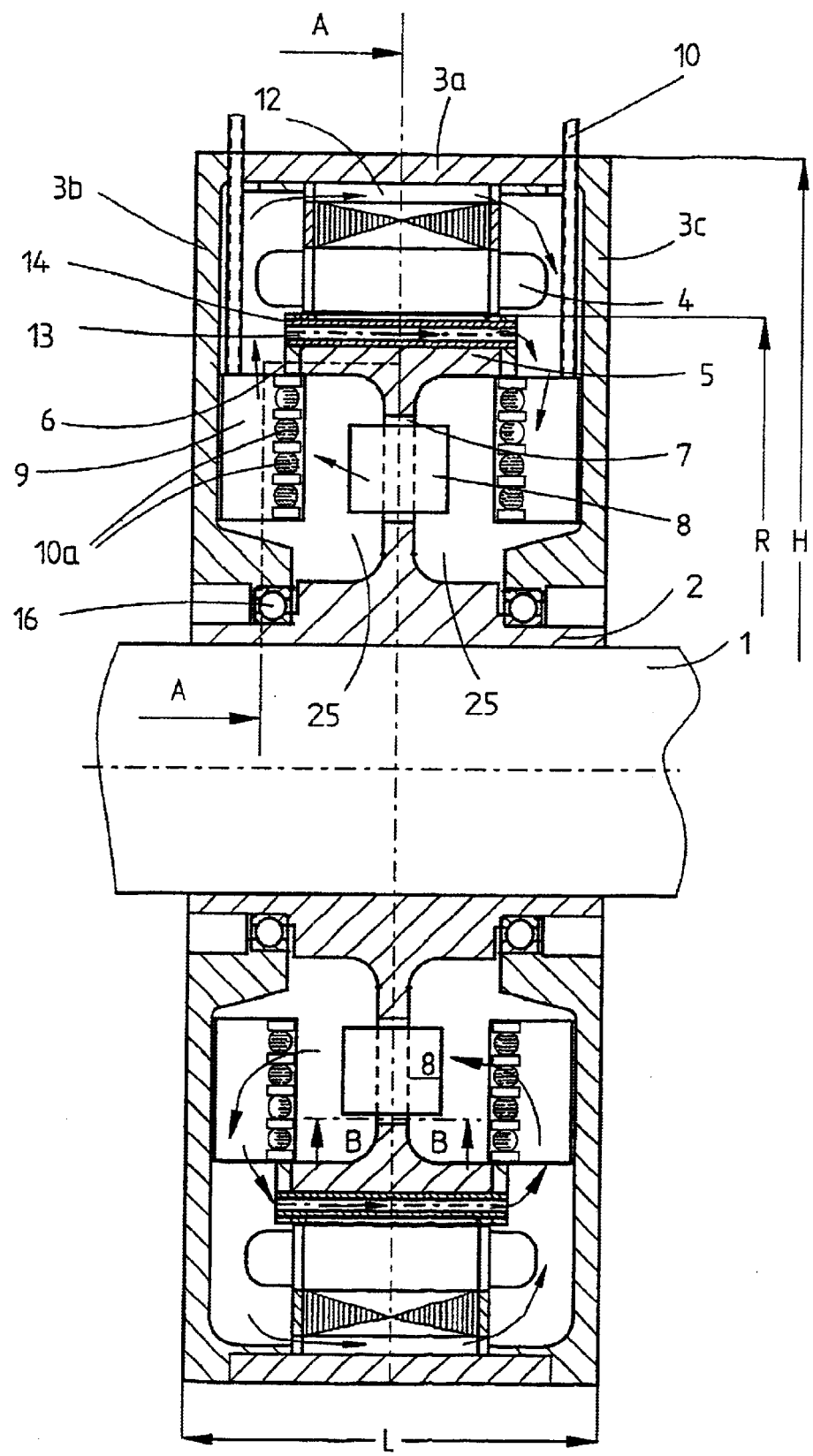
FIG. 3 shows another embodiment of an electric motor of the present invention.

The embodiment of the electric motor of the present invention, as shown in FIGS. 3 and 4, illustrates some further advantages. Annular heat exchangers 10a are positioned within annular chambers 25, allowing overall length L of motor housing 3a–c to be very small relative to outer diameter H of motor housing 3. The ratio of L:H between length L and outer diameter H is about 1:2.7. Furthermore, there exists an advantageous ratio between the diameter R of rotor 5 and the diameter H of housing 3 (R:H). According to the invention the ratio R:H is preferably between about 0.7:1 and 0.8:1. Bearings 16 are arranged between hollow motor shaft 2 and housing 3a–c. Therefore, the motor of FIG. 3 is known as a so-called slip-on motor, which is completely supported by shaft 1. Shaft 1 can be, for example, the journal of a paper machine roll. Housing 3 includes housing shell 3a and two housing covers 3b and 3c, which are connected to any stationary structure by way of a torque support (not shown).

The electrical motor illustrated in FIG. 3, has omitted radial air feeding channels 24 of FIG. 1. A part of the toroidal air stream flows through hollow short circuit bars 13 from one side to the other side of rotor 5. The toroidal air stream is illustrated as FIG. 3, may be a vertical longitudinal section in the form of two circular air streams, one above, and one below motor shaft 2. In the same manner, two circular air streams can be seen in a horizontal or vertical longitudinal section through the motor or in any other longitudinal section.

The details illustrated in FIG. 5 show how blower vane 8, as arranged in one of openings 7.1, helps to induce the toroidal air stream.

FIG. 6 illustrates the outer periphery of solid rotor 5B having a plurality of air circulating channels in the form of slots 14B, which extend substantially parallel to the axis of rotor 5 and which borders short-circuit bars 13B. Alternatively, radial air feeding channels 24 may or may not be provided.

Figure 7:
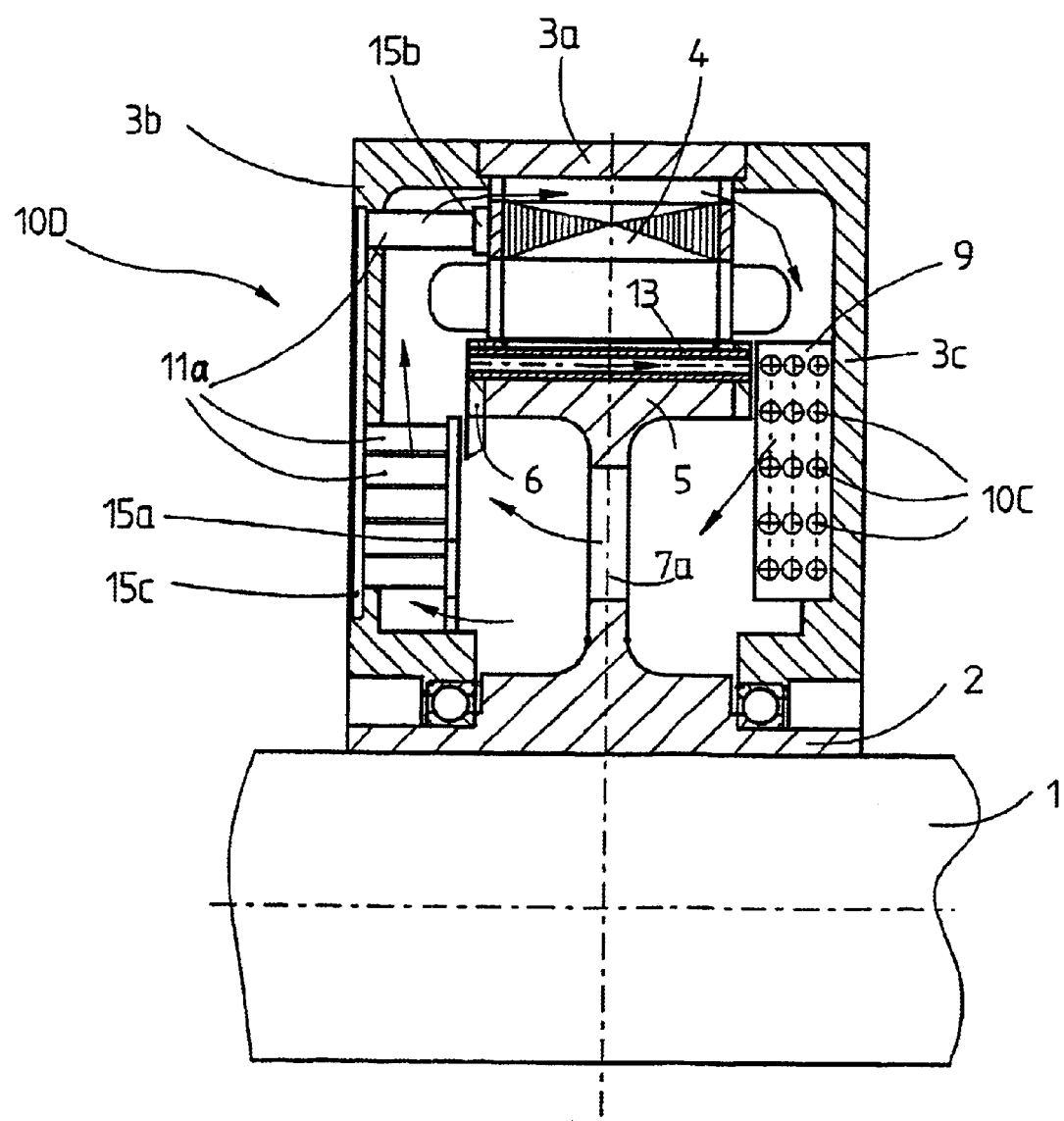
FIG. 7 shows yet another embodiment of the electric motor of the present invention.

The embodiment of the present invention shown in FIG. 7 differs from FIG. 3 in that annular heat exchangers, in the form of cooling liquid lines 10C and 10D, are positioned directly at the sides of rotor 5. Cooling liquid lines 10C are a one-piece-structure in the form of a so-called triple spiral, connected to housing cover 3c. Heat exchanger 10D, which is integrated into housing cover 3b, includes a plurality of short liquid pipes 11a connected to annular distributor heads 15a and 15b, and annular collector head 15c. Annular distributor head 15b may directly contact stator 4. An internal toroidal air stream is induced by radial vanes 7a and/or by a compressed air supply (not shown).

Figure 8:
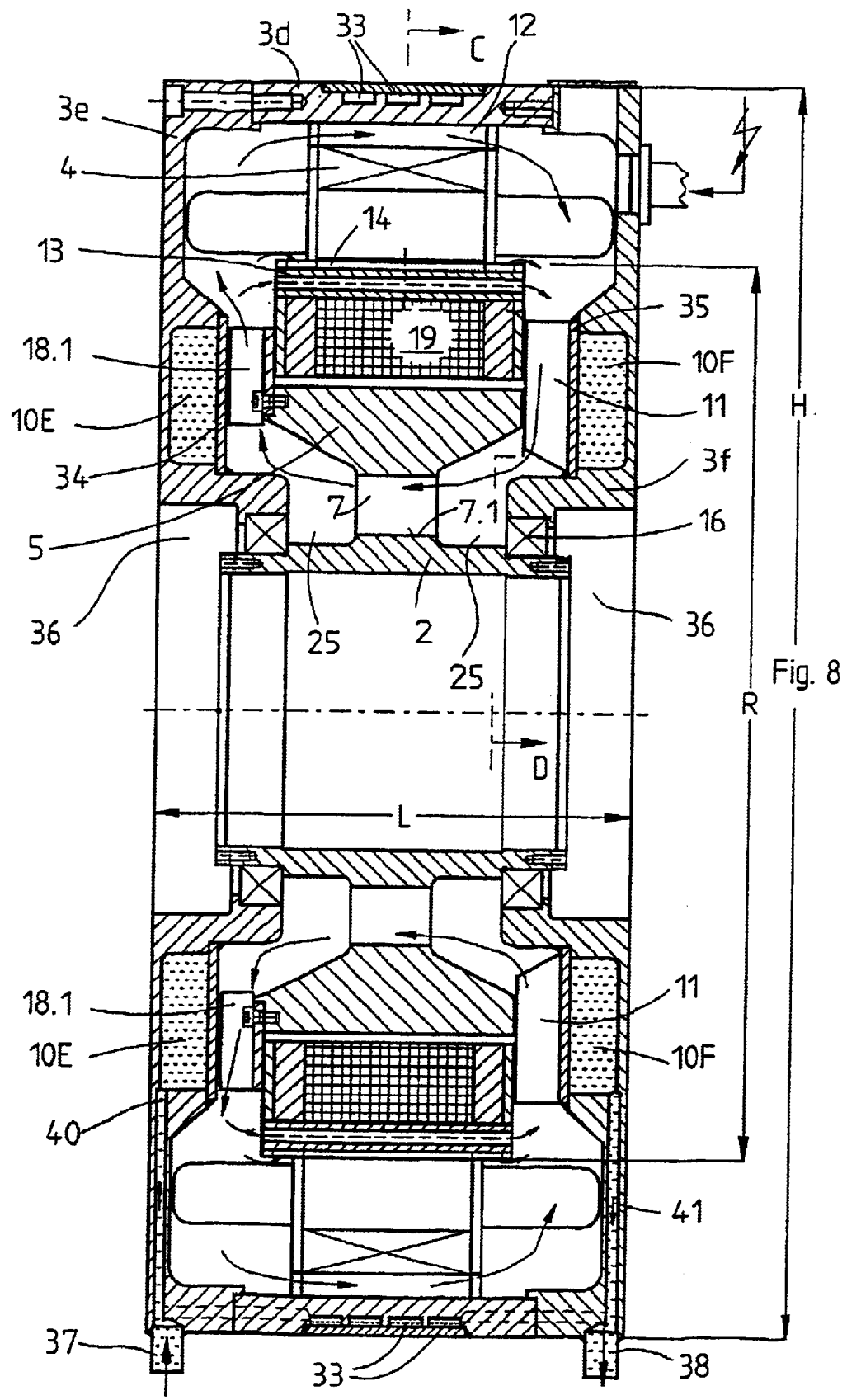
FIG. 8 is a longitudinal section of another embodiment of an electric motor of the present invention.
Figure 9:
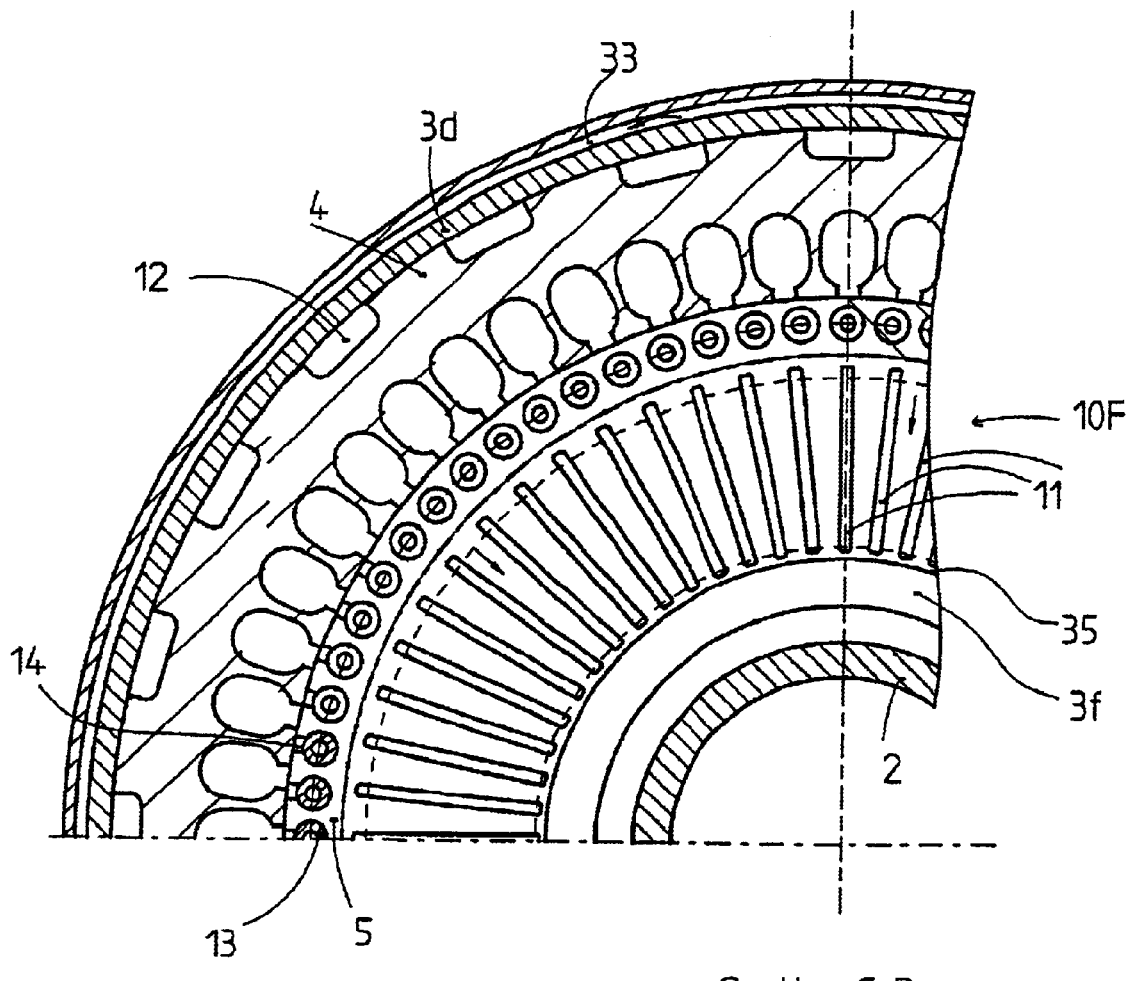
FIG. 9 shows a partial cross section along line C–D of FIG. 8.

Referring now to FIGS. 8–11, another embodiment of the electric motor of the present invention will now be described. Housing 3 again includes housing shell 3d and two housing covers 3e and 3f. Housing shell 3d, which is wrapped around annular stator 4, includes cooling liquid lines or one helical cooling liquid line 33 in order to improve the cooling of stator 4. Housing covers 3e and 3f are formed as annular heat exchangers each having an annular liquid channel 10E and 10F, respectively, covered by annular discs 34 and 35. Close to liquid channel 10E, annular rotor 5 carries a plurality of blower vanes 18.1 in the form of a blade ring. At housing cover 3f, annular disc 35 includes a plurality of cooling ribs 11, which extend, more or less, in a radial direction as shown in FIG. 9. The axial length of motor shaft 2A is shorter than the electrical motors illustrated in FIGS. 3 and 7, i.e. shorter than length L of housing 3e–f Therefore, bearings 16 are positioned closer to annular chambers 25. In this way, free spaces 36 are obtained within length L of housing 3e–f In one of these free spaces 36, fastening elements (not shown) can be arranged in order to connect motor shaft 2 to any roll journal or a similar element that is to be driven.

Figure 10:
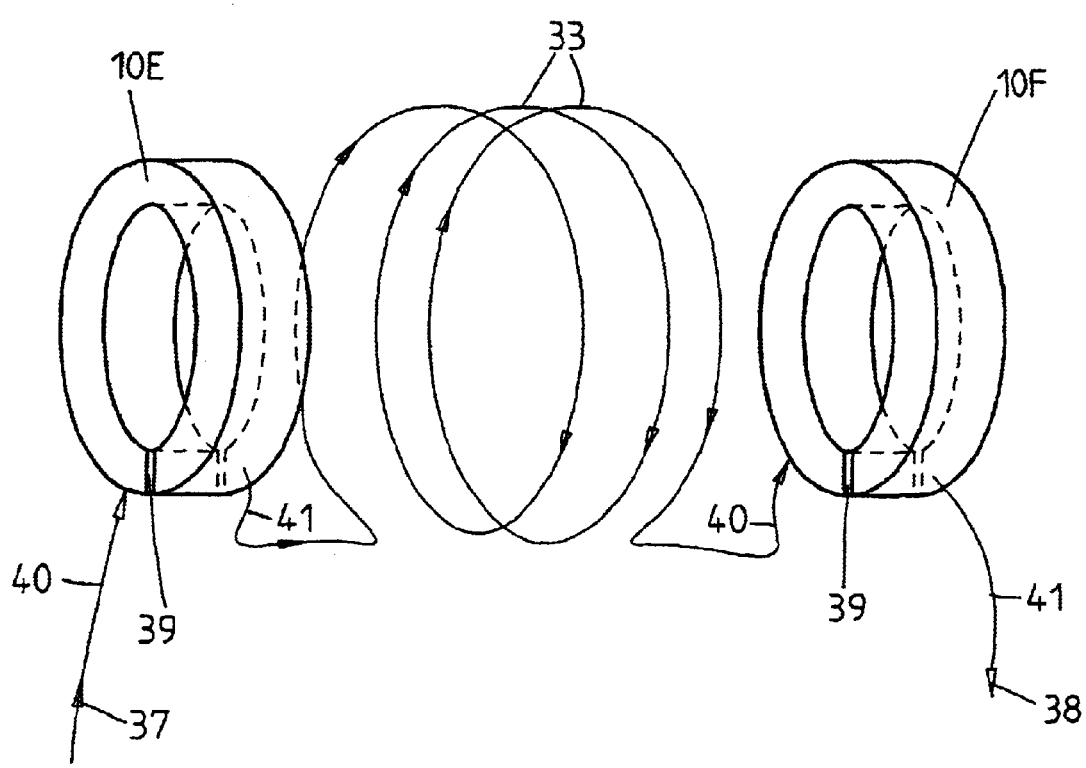
FIG. 10 shows schematically the cooling liquid system of the electric motor shown in FIG. 8.

Annular cooling liquid channels 10E and 10F and helical cooling liquid line 33 can be combined to one cooling liquid system, as shown in FIG. 10. Housing 3e–f includes only one cooling liquid inlet 37 and one cooling liquid outlet 38. Each liquid channel 10E and 10F includes a separating wall 39, so that the liquid flows only once through the annular channels, 10E and 10F with liquid supply 40 and liquid discharge 41 being arranged at both sides and close to wall 39. Liquid discharge 41 of channel 10E is connected via helical line 33 to liquid supply 40 of channel 10F. As a result, the cooling liquid flows first through channel 10E, then through cooling line 33 and finally through channel 10F where cooling ribs 11 transfer a relatively high amount of heat from the cooling air to the cooling liquid, directly before it leaves the motor via outlet 38.

Alternatively, from the embodiment of the present invention illustrated in FIG. 8, it is possible to arrange an annular liquid channel (e.g. 10e and/or 10F) at the outside of housing cover 3f. The channel is covered from the outside by an annular disc. Cooling ribs are attached directly to the inside of the housing cover.

Figure 11:
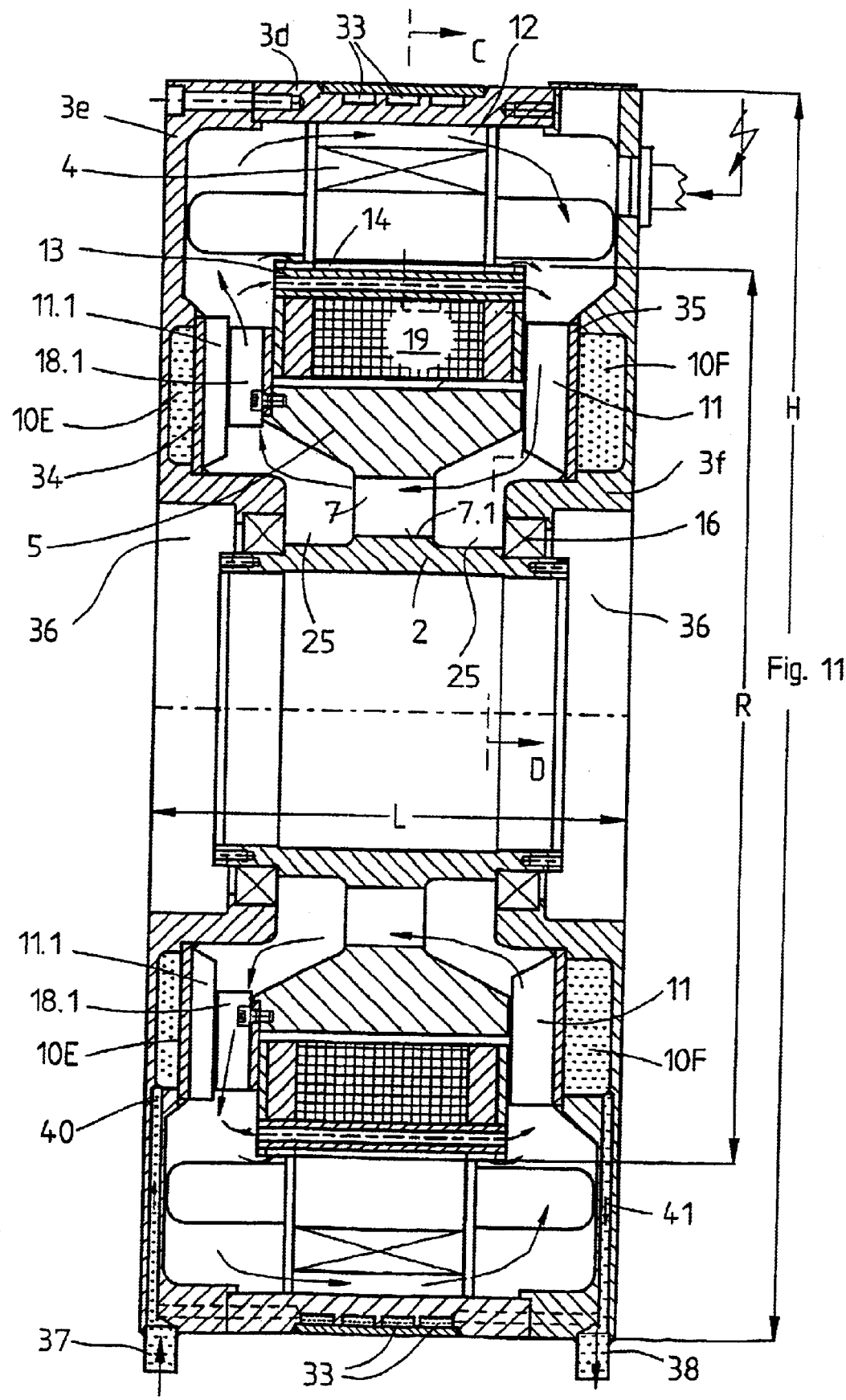
FIG. 11 shows a variation of the electric motor shown in FIG. 8.

A further embodiment of the present invention is shown in FIG. 11. Here, annular disc 34, of annular liquid chamber 10E, includes cooling ribs 11.1 in addition to the cooling ribs of the other side. If needed, such additional cooling ribs can be formed as stator blades working together with blower vanes 18.1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electric asynchronous motor for driving one of a shaft, a roll shell and a machine element, comprising:
   a housing;
   an annular stator having a first face at one end of said stator and a second face at an other end of said stator;
   an annular rotor having a first face at one end of said rotor and a second face at an other end of said rotor, said rotor at least partially disposed within said stator, both said stator and said rotor disposed within said housing;
   at least one connecting element;
   a motor shaft connected to said rotor by said at least one connecting element; and
   a cooling system disposed substantially in said housing, including:
      a cooling liquid;
      at least one annular heat exchanger disposed within said housing proximate at least one said face of said rotor, said at least one annular heat exchanger carrying said cooling liquid; and
      at least one annular air circulation channel in at least one of said annular stator and said annular rotor, said at least one annular air circulation channel being configured to guide air streams from at least one of said first face of said stator and said first face of said rotor to at least one of said second face of said stator and said second face of said rotor;
      wherein said cooling system is configured to provide an internal cooling air circuit by way of an air stream flowing proximate said at least one annular air circulation channel, said rotor, said stator, said shaft and said heat exchanger, said internal cooling air circuit defining an internal toroidal air stream.

2. The motor of claim 1, wherein said at least one connecting element is at least one of radial arms, rods, vanes and spokes.

3. The motor of claim 1, wherein said motor shaft is hollow.

4. The motor of claim 1, wherein said motor is configured to directly drive one of the shaft, the roll shell and the machine element.

5. The motor of claim 1, wherein said rotor includes a device which induces said toroidal air stream, said toroidal air stream flowing within said housing proximate said rotor and said shaft, said toroidal air stream progresses radially proximate said stator, then through said at least one annular series of air circulation channels, then radially proximate said rotor and said shaft, said toroidal air stream passing said at least one annular heat exchanger.

6. The motor of claim 1, wherein said rotor has an outer diameter R and said housing has an outer diameter H, a ratio of R to H being between approximately 0.6:1 and approximately 0.85:1.

7. The motor of claim 6, wherein said ratio R:H is between approximately 0.7:1 and approximately 0.75:1.

8. The motor of claim 1, wherein said housing has a length L and an outer diameter H, a ratio of L:H being between approximately 1:2.0 and approximately 1:3.4.

9. The motor of claim 8, wherein said ratio of L:H is between approximately 1:2.4 and approximately 1:3.0.

10. The motor of claim 1, wherein said at least one connecting element is configured to induce said toroidal air stream.

11. The motor of claim 1, further comprising a compressed air supply which at least one of induces or amplifies said toroidal air stream.

12. The motor of claim 1, wherein said first face of said rotor is at least partially disposed proximate an annular chamber, said second face of said rotor being at least partially disposed proximate an other annular chamber, said annular chamber and said other annular chamber being connected by way of openings in said at least one connecting element.

13. The motor of claim 1, wherein said rotor is formed substantially as a one-piece structure.

14. The motor of claim 1, wherein said rotor includes a plurality of laminated elements.

15. The motor of claim 1, further comprising a plurality of blower vanes, at least one of said plurality of blower vanes being connected to said rotor, said blower vanes configured to amplify said internal toroidal air stream.

16. The motor of claim 15, wherein at least one of said plurality of blower vanes are connected to said at least one connecting element.

17. The motor of claim 15, wherein at least one of said plurality of blower vanes are connected to at least one of said first face and second face of said rotor.

18. The motor of claim 17, wherein said rotor further comprises a plurality of short circuit rings, at least one of said plurality of blower vanes being connected to a corresponding one of said plurality of short circuit rings.

19. The motor of claim 17, wherein said plurality of blower vanes are connected to said first face of said rotor, said heat exchanger being located proximate said second face of said rotor.

20. The motor of claim 1, wherein said at least one annular heat exchanger includes a first annular heat exchanger and a second annular heat exchanger, said first annular heat exchanger located proximate said first face of said rotor, said second annular heat exchanger located proximate said second face of said rotor.

21. The motor of claim 20, further comprising a plurality of blower vanes, at least one of said plurality of blower vanes connected to one of said rotor, said first face of said rotor, said second face of said rotor and said connecting element, wherein said first annular heat exchanger is positioned proximate said plurality of blower vanes.

22. The motor of claim 1, wherein said at least one air circulation channel lies between said stator and said housing.

23. The motor of claim 1, wherein said at least one annular air circulation channel is a plurality of annular air circulation channels in the form of hollow short circuit bars within said rotor.

24. The motor of claim 1, wherein said at least one annular air circulation channel includes an annular gap between said rotor and said stator.

25. The motor of claim 1, wherein said rotor includes a plurality of short-circuit bars and a plurality of slots on an outer periphery of said rotor, said plurality of slots being substantially parallel to a rotational axis of said rotor, said plurality of slots bordering at least one of said plurality of short-circuit bars, between said stator and said outer periphery of said rotor an air gap is defined, said plurality of slots configured to induce an additional air stream to draw heat from said air gap.

26. The motor of claim 12, wherein said rotor further comprises:
   a plurality of hollow short-circuit bars; and
   a plurality of radial air feeding channels, which connect said openings to at least one of said air circulation channels and said plurality of hollow short-circuit bars.

27. The motor of claim 1, further comprising a plurality of liquid cooling lines, said cooling lines and said at least one annular heat exchanger being hermetically separated from an interior of said motor.

28. The motor of claim 1, further comprising at least one cooling line being formed as a one-piece structure including:
   a liquid inlet fluidly connected to said at least one heat exchanger; and
   a liquid outlet fluidly connected to said at least one heat exchanger.

29. The motor of claim 28, wherein said heat exchanger is formed as an annular liquid channel as a part of said housing, said at least one heat exchanger including cooling ribs extending from said annular liquid channel into the interior of the motor.

30. The motor of claim 29, wherein said annular liquid channel comprises:
   a liquid supply path;
   a liquid discharge path; and
   a separating wall between said liquid supply path and said liquid discharge path.

31. The motor of claim 18, wherein said at least one heat exchanger includes a second heat exchanger having a plurality of cooling ribs, at least one of said plurality of cooling ribs located proximate to at least one of a corresponding one of said plurality of blower vanes.

32. The motor of claim 31, wherein said plurality of cooling ribs are in the form of stator blades which coact with said plurality of blower vanes to enhance cooling of the motor.

33. The motor of claim 1, wherein said housing includes a cooling liquid line.

34. The motor of claim 33, wherein at least one of said annular heat exchangers further comprises cooling ribs, said cooling liquid line and said at least one annular heat exchanger in fluid communication with each other and configured such that said cooling liquid flows through said cooling liquid line and thereafter through said at least one annular heat exchanger.

35. The motor of claim 34, wherein said at least one annular heat exchanger includes a first heat exchanger and a second heat exchanger, said first heat exchanger and said second heat exchanger disposed on opposite sides of said rotor, said cooling liquid flowing through said first heat exchanger then through said second heat exchanger.

36. A method of cooling an electric asynchronous motor, comprising the steps of: providing an electric motor including:
   a housing;
   an annular stator having a face at each of two ends thereof;
   an annular rotor having a face at each of two ends thereof, said rotor at least partially disposed within said stator, both said stator and said rotor disposed within said housing;
   at least one connecting element; and
   a motor shaft connected to said rotor by said at least one connecting element;
   creating a toroidal cooling air stream in an area between said rotor and said motor shaft;
   continuing said toroidal cooling air stream through at least one annular series of air circulation channels from one face of one of said rotor and said stator to an other face of one of said rotor and said stator;
   directing said toroidal cooling air stream through an annular heat exchanger;
   transferring heat from said toroidal cooling air stream to a cooling liquid within said heat exchanger; and
   redirecting said toroidal cooling air stream back to said area between said rotor and said motor shaft.

* * * * *